(12) United States Patent
Cairns (10) Patent No.: US 8,000,413 B2
(45) Date of Patent: Aug. 16, 2011

(54) SELECTIVE SIGNAL DEMODULATION METHOD AND APPARATUS

(75) Inventor: Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1030 days.

(21) Appl. No.: 11/841,264

(22) Filed: Aug. 20, 2007

(65) Prior Publication Data

US 2009/0052584 A1  Feb. 26, 2009

(51) Int. Cl.
*H04L 27/06* (2006.01)

(52) U.S. Cl. ........ 375/340; 375/136; 375/142; 375/147; 375/316; 375/346; 375/349

(58) Field of Classification Search .................. 375/130, 375/134, 136–137, 142–145, 147–153, 316, 375/340, 346, 349
See application file for complete search history.

(56) References Cited

U.S. PATENT DOCUMENTS

| | | | |
|---|---|---|---|
| 7,012,978 B2 * | 3/2006 | Talwar | 375/346 |
| 7,440,489 B2 * | 10/2008 | Dahlman et al. | 375/147 |
| 7,577,118 B2 * | 8/2009 | Haumonte et al. | 370/330 |
| 2004/0219959 A1 * | 11/2004 | Khayrallah et al. | 455/575.7 |
| 2005/0201447 A1 | 9/2005 | Cairns et al. | |
| 2005/0215218 A1 * | 9/2005 | Bottomley et al. | 455/226.1 |
| 2006/0128326 A1 * | 6/2006 | Pietraski | 455/130 |

FOREIGN PATENT DOCUMENTS

| | | |
|---|---|---|
| WO | 2005096517 A1 | 10/2005 |
| WO | 2005096518 A1 | 10/2005 |
| WO | 2006132593 A2 | 12/2006 |
| WO | 2007149394 A2 | 12/2007 |
| WO | 2008000367 A1 | 1/2008 |

OTHER PUBLICATIONS

Co-pending U.S. Appl. No. 60/887,372, filed Jan. 31, 2007.
Co-pending U.S. Appl. No. 60/942,921, filed Jun. 8, 2007.
Golub, G. et al. Matrix Computations—3rd Edition. Baltimore, 1996. Johns Hopkins University Press, pp. 520-529.
Xiaofei, Zhang et al. "A Novel Adaptive Channel Estimation Method in WCDMA System based on Weighted Least Squares." 2004 7th International Conference on Signal Processing (ICSP '04). Aug. 31-Sep. 4, 2004, vol. 2, pp. 1699-1702.
Sadler, David J. et al. "MMSE Multiuser Detection for Array Multicarrier DS-CDMA in Fading Channels." IEEE Transactions on Signal Processing. Jul. 2005, vol. 53, Issue 7, pp. 2348-2358.
Co-pending U.S. Appl. No. 11/935,604, filed Nov. 6, 2007.

* cited by examiner

*Primary Examiner* — Chieh M Fan
*Assistant Examiner* — Sophia Vlahos
(74) *Attorney, Agent, or Firm* — Coats & Bennett, P.L.L.C.

(57) ABSTRACT

Signal quality estimation and demodulation are tailored to the received signal quality. According to one embodiment, a received signal is processed by determining a first set of combining weights based on a first impairment covariance estimate derived assuming a low signal quality environment. A second set of combining weights is determined based on a second impairment covariance estimate derived assuming a high signal quality environment. A metric is determined corresponding to the difference between symbol estimates derived from the second set of combining weights and hard symbol decisions. The received signal is demodulated based on the second set of combining weights if the metric satisfies a threshold indicating high signal quality and otherwise based on the first set of combining weights.

26 Claims, 3 Drawing Sheets

SELECTIVE SIGNAL DEMODULATION METHOD AND APPARATUS

BACKGROUND

The present invention generally relates to wireless communication systems, and particularly relates to processing received signals by such systems.

Signal quality estimation is a key feature of advanced wireless communication technologies such as Wideband CDMA (WCDMA), CDMA2000 1xRTT, CDMA2000 EV-DO, CDMA2000 EV-DV, etc. For high-speed data services in both the uplink and downlink directions, the receiver must determine and report a measure of signal quality such as signal to interference plus noise ratio (SINR) to the transmitter. The transmitter uses this information to determine what data rate (e.g., number of codes, modulation, coding, etc.) to send during the next transmission time interval (TTI).

Estimating the quality of a received WCDMA signal conventionally involves despreading the received signal, generating combining weights, and determining signal quality based on the combining weights. The standard model for despread WCDMA data is given by:

$$x_i = h s_i + u_i. \quad (1)$$

where $x_i$ is the despread data vector for the $i^{th}$ symbol period, h is a vector of net channel coefficients (which accounts for the transmit/receive filters and radio channel), $u_i$ is a vector of interference plus noise (denoted impairment), and $s_i$ is the $i^{th}$ symbol. Given a vector of combining weights w, symbol estimates for received data symbols may be obtained from:

$$\hat{z}_i = w^H x_i. \quad (2)$$

SINR for the $i^{th}$ symbol is then given by:

$$SINR = \frac{E_s |w^H h|^2}{w^H R_u w} \quad (3)$$

where $E_s = |s_i|^2$ and $R_u$ is the impairment covariance matrix given by $R_u = E\{uu^H\}$.

To achieve peak throughput, the receiver must correctly demodulate the transmitted data and accurately report SINR. This is particularly true for the Multiple-Input Multiple-Output (MIMO) and higher order modulation (HOM) schemes included in Release 7 of the WCDMA standard. MIMO and HOM can achieve higher throughput compared to previous methods, but require considerably higher signal quality to achieve peak rates.

Failure to accurately report SINR results in either overly aggressive or overly pessimistic coding/modulation at the transmitter. Either way, reduced overall throughput results. Past experience shows that signal quality estimation using conventional SINR estimators proves very difficult when signal quality is high. Conventional SINR estimators tend to yield biased or highly variant SINR estimates under these conditions. Signal demodulation likewise suffers when signal quality is high due to conventional means for estimating the impairment covariance matrix. Conventional impairment covariance estimation techniques are either highly complex or inaccurate when signal quality is high, thus adversely impacting high data rate users.

For example, in one conventional approach, a pilot channel is despread over a slot having ten pilot symbols, the modulation removed, and the sample impairment covariance matrix is computed from:

$$y_{i,pilot} = x_{i,pilot} s^* \quad (4)$$

$$\bar{y} = \frac{1}{10} \sum_{i=1}^{10} y_{i,pilot}$$

$$\hat{R}_u = \frac{1}{9} \sum_{i=1}^{10} (y_{i,pilot} - \bar{y}_{pilot})(y_{i,pilot} - \bar{y}_{pilot})^H$$

where $x_{i,pilot}$ is the despread pilot data and $y_{i,pilot}$ is the demodulated pilot data. Typically, the slot-based impairment covariance matrix estimate $\hat{R}_u$ of equation (4) is smoothed (i.e., averaged) over multiple slots to reduce estimation noise and provide reasonable performance. However, this approach requires considerable averaging to achieve good performance. While averaging does not adversely impact demodulation performance at low speed, demodulation at moderate to high speeds becomes impractical using this impairment covariance estimation approach. SINR estimation using this approach is also unreliable at moderate to high speeds.

In another conventional approach, the impairment covariance matrix is calculated using a model. The model is given by:

$$R_u = \sum_{j=1}^{J} E_c(j) R_I(g_j) + N_0 R_n \quad (5)$$

where $E_c(j)$ represents the total energy per chip of base station j, $R_I(g_j)$ is an interference term that depends on the radio (or medium) channel between the $j^{th}$ base station and the receiver $g_j$, $N_0$ represents the power of the white noise passing through the receive filter, and $R_n$ is a thermal noise covariance term arising from the autocorrelation properties of receiver filtering. The receiver typically does not have knowledge of $g_j$, $E_c(j)$ or $N_0$, so these parameters must be estimated.

This technique works well for low to moderate SINR conditions because $g_j$, $E_c(j)$ and $N_0$ can be reliably estimated. However, when SINR becomes high, the ability to estimate $N_0$ degrades substantially. As a result, the SINR estimates saturate. SINR saturation prevents a receiver from achieving the peak rates offered by MIMO and HOM.

Some conventional approaches directly estimate SINR by computing symbol estimates for the pilot channel over a slot as:

$$\hat{z}_{i,pilot} = w^H x_{i,pilot} \quad (6)$$

The sample mean and sample variance of the pilot symbol estimates can then be calculated from:

$$\bar{z} = \frac{1}{10} \sum_{i=1}^{10} \hat{z}_{i,pilot} \quad (7)$$

$$\sigma_z^2 = \frac{1}{9} \sum_{i=1}^{10} (\hat{z}_{i,pilot} - \bar{z})(\hat{z}_{i,pilot} - \bar{z})^*$$

SINR can be directly estimated via:

$$SINR = \frac{\bar{z}^2 - \sigma_z^2 / 10}{\sigma_z^2} \quad (8)$$

Typically, direct estimation of SINR must be smoothed over multiple slots to reduce the variance of the estimator. The averaging needed for reducing the estimation variance causes a considerable difference between the actual SINR and the reported SINR. This difference may result in overly aggressive or overly pessimistic coding/modulation as previously explained.

SUMMARY

According to the methods and apparatus taught herein, signal quality estimation and demodulation is based on a first set of combining weights when a signal of interest is received with low signal quality and a second set of combining weights when the signal is received with high signal quality. The first set of combining weights is generated based on low signal quality assumptions, thus providing good SINR estimation and demodulation efficiency when SIR is low. The second set of combining weights is generated based on high signal quality assumptions, thus providing good SINR estimation and demodulation efficiency when SIR is high. A metric is calculated for determining which set of combining weights is selected.

The metric indicates whether the receiver is demodulating a high or low quality signal. In one embodiment, the metric is determined by calculating the error between symbol estimates derived from the second set of combining weights (the high-SINR combining weights) and the corresponding hard symbol decisions. The error is accumulated over a WCDMA slot of interest to provide the metric. The hard symbol decisions may be determined by normalizing the symbol estimates so that the average power of the symbol estimates is the same as the average power of the symbol constellation associated with the received signal. A point on the constellation is identified for each symbol estimate that minimizes the Euclidean distance between the symbol estimate and the constellation point. The resulting constellation points are hereafter denoted hard symbol decisions. The error between each hard symbol decision and the corresponding normalized symbol estimate is an approximate measure of the correctness of the hard symbol decision.

After the metric is calculated, it is compared to a threshold to determine which set of combining weights should be used for signal quality estimation and demodulation. In one embodiment, the threshold depends on the modulation scheme associated with the received signal. This way, evaluation of the metric changes for different modulation schemes. Regardless, the high-SINR combining weights are used for signal quality estimation and demodulation when the metric satisfies the threshold. Otherwise, the first set of combining weights is used. This way, the receiver reliably processes received signals regardless of whether the received signal quality is high or low.

According to one embodiment, a received signal is processed by determining a first set of combining weights based on a first impairment covariance estimate derived assuming a low signal quality environment. A second set of combining weights is determined based on a second impairment covariance estimate derived assuming a high signal quality environment. A metric is determined corresponding to the difference between symbol estimates derived from the second set of combining weights and hard symbol decisions. The received signal is demodulated based on the second set of combining weights if the metric satisfies a threshold indicating high signal quality and otherwise based on the first set of combining weights. A signal quality estimate for the received signal may be calculated based on the second set of combining weights when the metric satisfies the threshold. Otherwise, the first set of combining weights may be used to estimate received signal quality.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
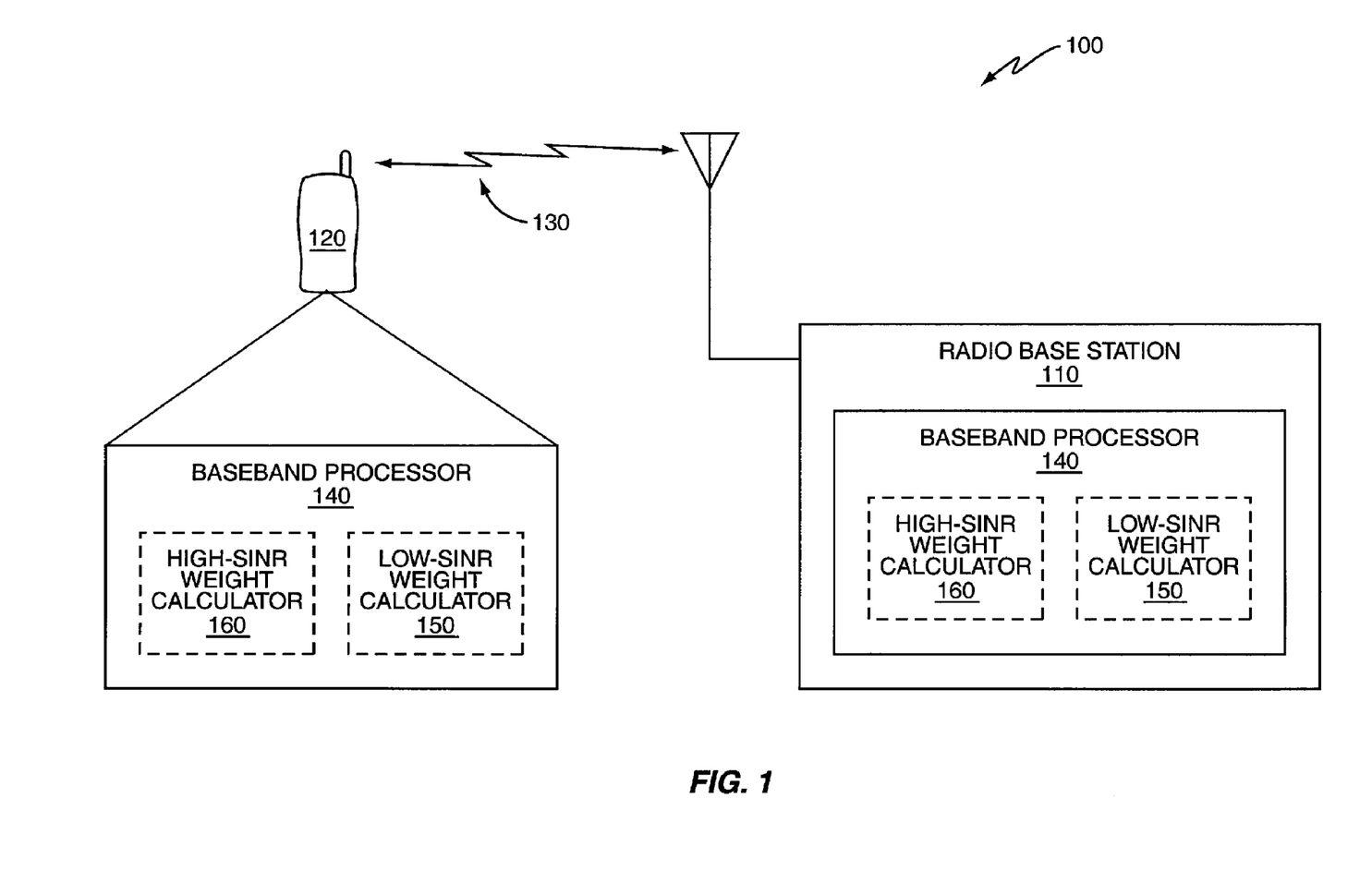
FIG. 1 is a block diagram of an embodiment of a wireless communication system.

FIG. 1 illustrates an embodiment of a wireless communication system 100 including a radio base station 110 that provides wireless communication services to a mobile device 120 such as a mobile phone. The mobile device 120 and the base station 110 communicate over one or more wireless communication channels 130. The base station 110 and the mobile device 120 support High Speed Packet Access (HSPA) services. Accordingly, data is transmitted from the base station 110 to the mobile device 120 over one or more downlink channels and the mobile device 120 communicates with the base station 110 via one or more uplink channels. As such, the term "receiver" as used herein refers to the mobile device 120 for downlink communication and to the base station 110 for uplink communication.

Both the mobile device 120 and base station 110 have a baseband processor 140 for processing received signals. The baseband processor 140 included in the mobile device 120 estimates received signal quality and demodulates received signals during downlink communication. The baseband processor 140 included in the base station 110 likewise performs signal quality estimation and demodulation during uplink communication. The baseband processors 140 generate signal quality estimates and demodulate received signals based on a first set of combining weights when receiving a low quality signal and a different set of combining weights when receiving a high quality signal.

To this end, each baseband processor 140 includes a first combining weight calculator 150 for generating the first set of combining weights and a second combining weight calculator 160 for generating the second set. The combining weight calculators 150, 160 may be physically implemented separately or as the same functional unit. Either way, the first set of combining weights are referred to herein as low-SINR combining weights to indicate that the weights are determined based on the assumption that the received signal is of low quality. Similarly, the second set of combining weights are referred to herein as high-SINR combining weights to indicate that the second set of weights is determined based on the assumption that the received signal is of high quality. In general, any parameter labeled 'low-SINR' herein indicates that the parameter is determined based on the assumption that the signal quality environment is low while the label 'high-SINR' indicates a high signal quality assumption.

As such, the low-SINR combining weights are used to estimate signal quality and demodulate received signals when the received signal is of low quality. Conversely, the high-SINR combining weights are used for demodulation and signal quality estimation when the received signal is of high quality. Each baseband processor 140 calculates a metric that indicates whether the received signal is of high or low quality.

In one embodiment, the metric is determined by calculating the error between symbol estimates derived from the high-SINR combining weights and hard symbol decisions and accumulating the error over a WCDMA slot of interest. The hard symbol decisions may be determined by comparing the symbol constellation associated with the received signal to the symbol estimates. A point on the constellation is identified for each symbol estimate that minimizes the Euclidean distance between the symbol estimate and the constellation point (hard symbol decision). The error between the hard symbol decision and the corresponding normalized symbol estimate is used to determine the metric and is an approximate measure of the correctness of the hard symbol decision.

The metric, however calculated, is then compared to a threshold for determining which set of combining weights should be used for signal quality estimation and demodulation. Preferably, the threshold depends on the modulation scheme associated with the received signal since different modulation schemes have different impairment susceptibilities. This way, combining weight selection depends on the particular modulation scheme used to transmit the received signal. Regardless, the high-SINR combining weights are selected when the metric satisfies the threshold. Otherwise, the low-SINR combining weights are chosen. The selected set of combining weights are used to generate signal quality estimates and demodulate received signals. Processing received signals using combining weights tailored to the signal quality environment ensures accurate SINR reporting and efficient demodulation.

Figure 2:
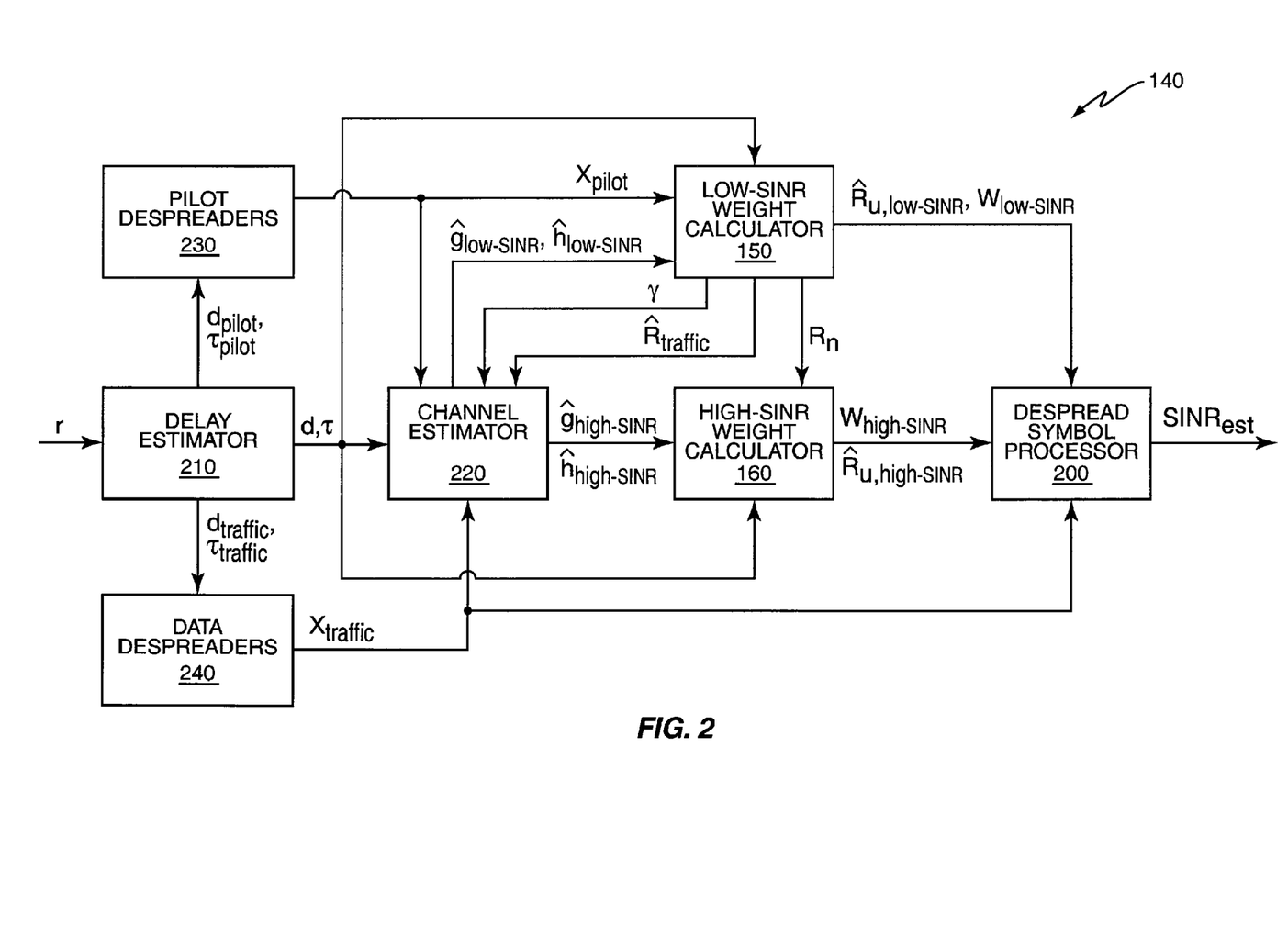
FIG. 2 illustrates an embodiment of baseband processor.

FIG. 2 illustrates an embodiment of the baseband processors 140. According to this embodiment, the low-SINR weight calculator 150 determines a set of low-SINR combining weights $w_{low\text{-}SINR}$ based on low-SINR net $\hat{h}_{low\text{-}SINR}$ and medium $\hat{g}_{low\text{-}SINR}$ channel estimates and an impairment covariance estimate $\hat{R}_{u,low\text{-}SINR}$ derived from the low-SINR medium channel estimates. The high-SINR weight calculator 160 determines a set of high-SINR combining weights $w_{high\text{-}SINR}$ based on high-SINR net $\hat{h}_{high\text{-}SINR}$ and medium $\hat{g}_{high\text{-}SINR}$ channel estimates and a different impairment covariance estimate $\hat{R}_{u,high\text{-}SINR}$ derived from the high-SINR medium channel estimates. Alternatively, both the low-SINR and high-SINR impairment covariance estimates may be determined based on the high-SINR medium $\hat{g}_{high\text{-}SINR}$ channel estimates.

Either way, a despread symbol processor 200 determines a metric for selecting one set of the combining weights for use in generating signal quality estimates and demodulating received signals. The metric corresponds to the difference between symbol estimates $\hat{z}$ derived from the high-SINR combining weights $w_{high\text{-}SINR}$ and hard symbol decisions $\hat{s}^{hard}$. The despread symbol processor 200 demodulates despread data values $x_{traffic}$ based on the high-SINR combining weights $w_{high\text{-}SINR}$ if the metric satisfies a threshold. Otherwise, the low-SINR combining weights $w_{low\text{-}SINR}$ are used. The despread symbol processor also 200 calculates a signal quality estimate such as SINR based on the selected set of combining weights.

In more detail, a received baseband signal r has data and pilot signal components. A delay estimator 210 estimates channel path delays τ associated with one or more multipath fading channels from which the signal is received, e.g., by evaluating an impulse response of the channel(s) over a range of delay values. The delay estimator also estimates signal processing delays d used for de-spreading the received signal (e.g., G-RAKE finger delays or chip equalizer filter tap locations). The path delays may be a subset of the processing delays. Regardless, the signal and path delay estimates d, τ are provided to a channel estimator 220 for use in generating the low-SINR and high-SINR net and medium channel estimates.

The signal processing and path delay estimates d, τ are provided to the pilot despreaders 230 as well as the to data despreaders 240. The pilot despreaders 230 and the data despreaders 240 despread the respective signals based on the signal and path delay estimates d, τ. The despread pilot values $x_{pilot}$ and the despread data values $x_{traffic}$ are used to generate channel estimates and various interference, noise and impairment covariance estimates as described in more detail below.

The channel estimator 220 computes the low-SINR net channel estimates $\hat{h}_{low\text{-}SINR}$ based on the despread pilot values $x_{pilot}$ as given by:

$$\hat{h}_{low\text{-}SINR} = \frac{1}{K}\sum_{i=0}^{K-1} x_{i,pilot}s^* \qquad (9)$$

where K corresponds to the number of pilot symbols received in a WCDMA slot (e.g., 10 CPICH pilot symbols per slot) and s represents a known pilot symbol. From the low-SINR net channel estimates, the low-SINR medium channel estimates can be computed via:

$$\hat{g}_{low\text{-}SINR}=(B^H B)^{-1}B^H \hat{h}_{low\text{-}SINR} \qquad (10)$$

where B is a J×M matrix that relates the M medium channel coefficients at path delays τ to the J net channel coefficients at signal processing delays d. The matrix B is given by $$B = \begin{bmatrix} R_p(\tau_0-\tau_0) & R_p(\tau_0-\tau_1) & \cdots & R_p(\tau_0-\tau_{L-1}) \\ R_p(\tau_1-\tau_0) & R_p(\tau_1-\tau_1) & \cdots & R_p(\tau_1-\tau_{L-1}) \\ \vdots & \vdots & \ddots & \\ R_p(\tau_{L-1}-\tau_0) & R_p(\tau_{L-1}-\tau_1) & \cdots & R_p(\tau_{L-1}-\tau_{L-1}) \end{bmatrix} \qquad (11)$$

where $R_p$ represents the convolution of the transmit and receive filter impulse responses. The channel estimator 220 also calculates the high-SINR net channel estimates $\hat{h}_{high\text{-}SINR}$ from the low-SINR net channel estimates $\hat{h}_{low\text{-}SINR}$. In one embodiment, the high-SINR net channel estimates are minimum mean square error (MMSE) estimates given by:

$$\hat{h}_{high\text{-}SINR}=BR_g B^H(BR_g B^H+R_u)^{-1}\hat{h}_{low\text{-}SINR} \qquad (12)$$

where the matrix $R_g$ corresponds to the medium coefficients correlation matrix ($R_g=E\{g_{low\text{-}SINR}g_{low\text{-}SINR}^H\}$). MMSE medium channel estimates may then be obtained from:

$$\hat{g}_{high\text{-}SNR}=(B^H B)^{-1}B^H \hat{h}_{high\text{-}SINR} \qquad (13)$$

MMSE channel estimates may be calculated in other ways, e.g., as disclosed in commonly assigned U.S. patent application Ser. No. 11/538,074, the content of which is incorporated herein by reference in its entirety.

Regardless, the low-SINR net $\hat{h}_{low\text{-}SINR}$ and medium $\hat{g}_{low\text{-}SINR}$ channel estimates and the despread pilot values $x_{pilot}$ are provided to the low-SINR combining weight calculator 150 for determining the low-SINR combining weights $w_{low\text{-}SINR}$ and the low-SINR impairment covariance matrix estimate $\hat{R}_{u,low\text{-}SINR}$. In parallel, the high-SINR net $\hat{h}_{high\text{-}SINR}$ and medium $\hat{g}_{high\text{-}SINR}$ channel estimates are provided to the high-SINR combining weight calculator 160. The high-SINR channel estimates are more accurate than the low-SINR channel estimates for high signal quality environments, thus yielding more precise combining weights and impairment covariance estimates when the received signal is of high quality.

Continuing, the low-SINR combining weight calculator 150 generates an interference covariance matrix $R_I(\hat{g}_{low\text{-}SINR})$ and noise covariance matrix $R_n$. The interference and noise covariance matrices $R_I(\hat{g}_{low\text{-}SINR})$ and $R_n$ are given by:

$$R_I(d_1, d_2) = \sum_{l=0}^{L-1}\sum_{q=0}^{L-1} \hat{g}_{low\text{-}SINR}(l)\hat{g}^*_{low\text{-}SINR}(q) \sum_{\substack{m=-\infty \\ m \neq 0}}^{m=\infty} R_p(d_1 - mT_C - \tau_l)R_p^*(d_2 - mT_c - \tau_q) \quad (14)$$

$$R_n(d_1, d_2) = R_p(d_1 - d_2)$$

The low-SINR combining weight calculator 150 also generates a data correlation matrix $\hat{R}_{traffic}$ from one (or more) codes of the traffic channel via:

$$\hat{R}_{traffic} = \frac{1}{P}\sum_{p=0}^{P-1}\frac{1}{K}\sum_{k=0}^{K-1} x^p_{k,traffic}(x^p_{k,traffic})^* \quad (15)$$

where $x^p_{k,traffic}$ denotes a vector of despread traffic symbols associated with the $p^{th}$ code for the $k^{th}$ symbol time. A least-squares fitting is performed as given by the following fitting equation:

$$\hat{R}_{traffic} \approx \alpha R_I(\hat{g}_{low\text{-}SINR}) + \beta R_n + \gamma h_{low\text{-}SINR} h_{low\text{-}SINR}^H \quad (16)$$

where the matrix term $h_{low\text{-}SINR} h_{low\text{-}SINR}^H$ is the outer product of the result of equation (9) while the other two matrix terms are obtained from equation (14), respectively. The least-squares fitting process produces estimates of the scalar terms $\hat{\alpha}$, $\hat{\beta}$, and $\hat{\gamma}$.

Figure 3:
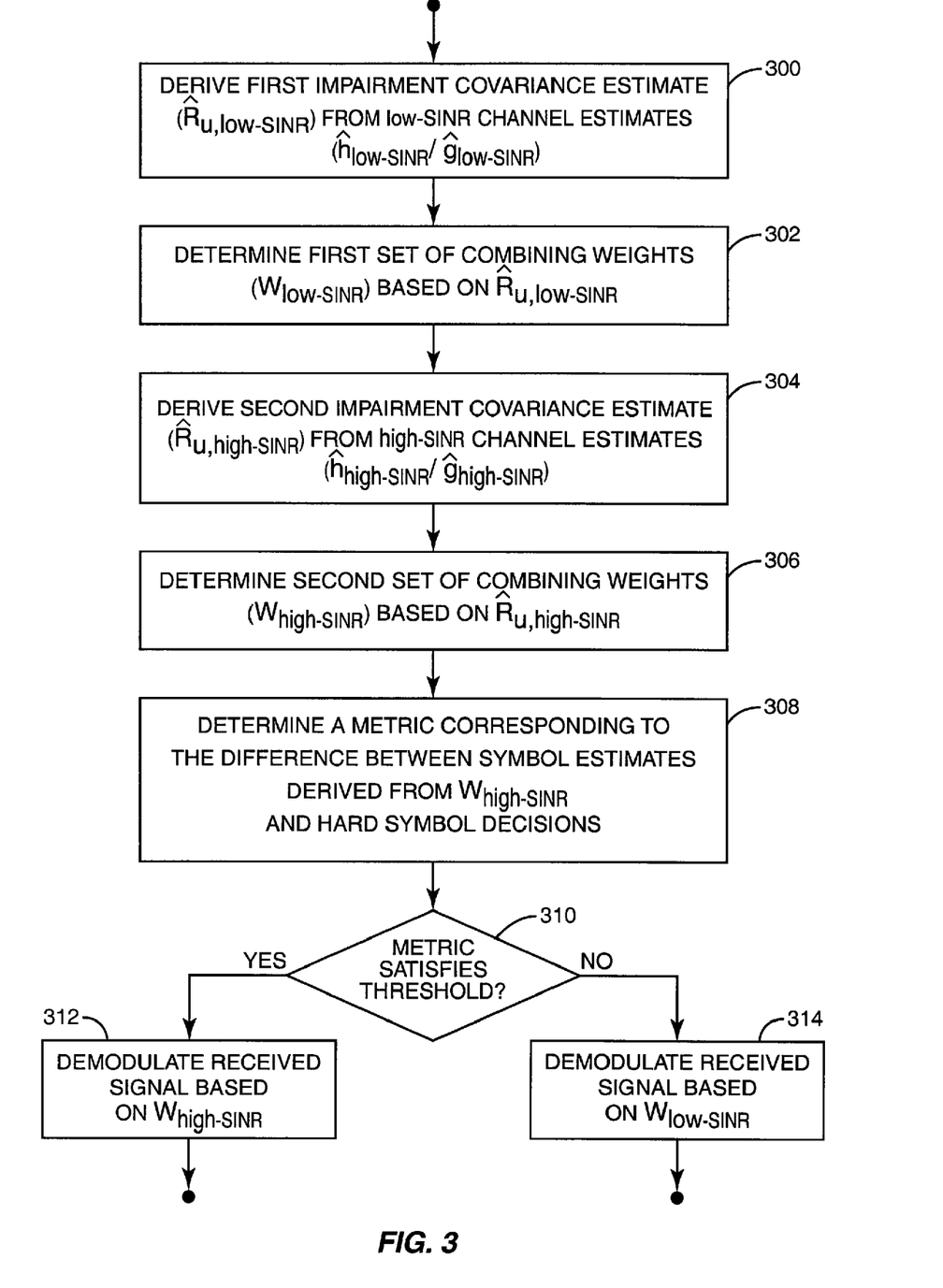
FIG. 3 is a logic flow diagram of an embodiment of processing logic for processing received signals based on the signal quality environment.

A low-SINR estimate of the impairment covariance matrix $R_{u,low\text{-}SINR}$ is then generated, e.g., as illustrated by Step 300 of FIG. 3, as given by:

$$\hat{R}_{u,low\text{-}SINR} = \hat{\alpha}R_I(\hat{g}_{low\text{-}SINR}) + \hat{\beta}R_n \quad (17)$$

The low-SINR combining weights $w_{low\text{-}SINR}$ are determined, e.g., as illustrated by Step 302 of FIG. 3, based on $\hat{R}_{u,low\text{-}SINR}$ and $\hat{h}_{low\text{-}SINR}$ as given by:

$$w_{low\text{-}SINR} = \hat{R}_{u,low\text{-}SINR}^{-1} \hat{h}_{low\text{-}SINR} \quad (18)$$

True matrix inversion is not needed to calculate the low-SINR combining weights in accordance with equation (17) because iterative methods like Gauss-Seidel are sufficient when signal quality is low to moderate.

Turning now to the high-SINR combining weight calculator 160, the high-SINR medium channel estimates $\hat{g}_{high\text{-}SINR}$ are used to calculate an impairment covariance matrix estimate $R_I(\hat{g}_{high\text{-}SINR})$ as given by:

$$R_I(d_1, d_2) = \sum_{l=0}^{L-1}\sum_{q=0}^{L-1} \hat{g}_{low\text{-}SINR}(l)\hat{g}^*_{low\text{-}SINR}(q) \sum_{\substack{m=-\infty \\ m \neq 0}}^{m=\infty} R_p(d_1 - mT_C - \tau_l)R_p^*(d_2 - mT_c - \tau_q) \quad (19)$$

The high-SINR combining weight calculator 160 then generates a high-SINR estimate of the impairment covariance matrix, e.g., as illustrated by Step 304 of FIG. 3, as given by:

$$\hat{R}_{u,high\text{-}SINR} = \hat{\alpha}R_I(\hat{g}_{high\text{-}SINR}) + \beta_{nominal}R_n \quad (20)$$

where the noise covariance matrix $R_n$ generated by the low-SINR combining weight calculator 150 is re-used by the high-SINR combining weight calculator 160. The scalar $\hat{\alpha}$ calculated by the low-SINR weight calculator 150 is also re-used. However, a new noise power scalar $\beta_{nominal}$ is determined by the high-SINR combining weight calculator 160. The new noise power scalar $\beta_{nominal}$ is assumed to be a small, non-zero positive number because the signal quality is presumed to be high.

A set of high-SINR combining weights $w_{high\text{-}SINR}$ are determined, e.g., as illustrated by Step 306 of FIG. 3, based on $R_I(\hat{g}_{high\text{-}SINR})$ and $\hat{h}_{high\text{-}SINR}$ as given by:

$$w_{high\text{-}SINR} = \hat{R}_{u,high\text{-}SINR}^{-1} \hat{h}_{high\text{-}SINR} \quad (21)$$

True matrix inversion or an exact solution to a system of linear equations (i.e. $\hat{R}_{u,high\text{-}SINR}^{-1} w_{high\text{-}SINR} = \hat{h}_{high\text{-}SINR}$) is used to obtain the high-SINR combining weights $w_{high\text{-}SINR}$. Alternatively, a conjugate gradient algorithm such as the kind disclosed in *Matrix Computations—3$^{rd}$ edition*, by G. Golub and C. van Loan (Johns Hopkins University Press, 1996), the content of which is incorporated herein by reference in its entirety, is used to obtain the high-SINR combining weights $w_{high\text{-}SINR}$.

Regardless, two sets of combining weights are available for use in calculating signal quality estimates and performing signal demodulation. The despread symbol processor 200 generates a metric and compares the metric to a threshold for determining which set of combining weights to select. Segments of the metric generation and SINR estimation processes may be carried out in tandem by the baseband processor 140. In one embodiment, the despread symbol processor 200 calculates symbol estimates $\hat{z}_k^p$ for one or more codes of the traffic channel using the high-SINR combining weights $w_{high\text{-}SINR}$ as given by:

$$\hat{z}_k^p = w_{high\text{-}SINR}^H x_{k,traffic}^p \quad k=0,1,\ldots,K-1;\ p=0,1,\ldots,P-1 \quad (22)$$

where k corresponds to traffic symbol indices and p corresponds to one or more codes received by a high-speed data user, each code having a relatively low spreading factor (e.g. the spreading factor is 16 for the high-speed downlink packet access—HSDPA). The low spreading factor means that there are many data symbols per code during a WCDMA slot. The despread data from one or more codes of the high-speed data signal can be used by the despread symbol processor 200 to generate SINR estimates and is also referred to herein as the traffic signal or traffic data.

The symbol estimates $\hat{z}_k^p$ are compared to the signal constellation associated with the received signal to generate hard symbol decisions $\hat{s}_k^{p,hard}$. The error between the symbol estimates $\hat{z}_k^p$ and the hard decisions $\hat{s}_k^{p,hard}$ is computed and summed over a WCDMA slot to give to yield the combining weight selection metric. In tandem, demodulation and scaling is removed from the despread traffic data $x_{k,traffic}^p$ as given by:

$$y_{k,traffic}^p = x_{k,traffic}^p (\hat{s}_k^{p,hard})^* \mu_k \quad k=0,1,\ldots,K-1;\ p=0,1,\ldots,P-1 \quad (23)$$

The despread traffic values $x_{k,traffic}^p$ are scaled by applying a symbol scaling factor $\mu_k^p$ to the despread traffic values $x_{k,traffic}^p$ and the hard symbol decisions $\hat{s}_k^{p,hard}$ in accordance with equation (23). The symbol scaling factor $\mu_k^p$ is a power scaling factor associated with the hard symbol decisions $\hat{s}_k^{p,hard}$ and is given by:

$$\mu_k^p = \frac{1}{|\hat{s}_k^{p,hard}|^2} \quad (24)$$

The despread symbol processor 200 then calculates the sample covariance matrix $R_y$ of the scaled despread traffic values $y_{k,traffic}^p$ as given by:

$$\bar{y}_{traffic} = \frac{1}{P}\sum_{p=0}^{P-1}\frac{1}{K}\sum_{k=0}^{K-1} y_{k,traffic}^p \quad (25)$$

$$R_y = \frac{1}{P}\sum_{p=0}^{P-1}\frac{1}{K}\sum_{k=0}^{K-1} (y_{k,traffic}^p - \bar{y}_{traffic})(y_{k,traffic}^p - \bar{y}_{traffic})^H$$

An impairment covariance matrix estimate $\hat{R}_u^{hard}$ can then obtained from the sample covariance matrix $R_y$ and the symbol scaling factor $\mu_k^p$ as given by:

$$\hat{R}_u^{hard} = \frac{R_y}{\left(\frac{1}{P}\sum_{p=0}^{P-1}\frac{1}{K}\sum_{k=0}^{K-1}\mu_k^p\right)} \quad (26)$$

Provided that most of the hard symbol decisions $\hat{s}_k^{hard}$ are correct, equation (26) provides a very good estimate of the impairment covariance matrix $R_u$ which can then be used to calculate SINR.

The despread symbol processor 200 in parallel normalizes the symbol estimates $\hat{z}_k^p$ as given by:

$$\sigma_{ref}^2 = \frac{1}{P}\sum_{p=0}^{P-1}\frac{1}{K}\sum_{k=0}^{K-1}|\hat{z}_k^p|^2; \quad (27)$$

$$\tilde{z}_k^p = \hat{z}_k^p / \sqrt{\sigma_{ref}^2}$$

$$k = 0, 1, \ldots, K-1; p = 0, 1, \ldots, P-1$$

A constellation point is chosen for each symbol estimate $\tilde{z}_k^p$ that minimizes the Euclidean distance between the symbol estimate $\tilde{z}_k^p$ and the constellation point. Each constellation point becomes a hard symbol decision $\hat{s}_k^{p,hard}$.

The despread symbol processor 200 computes the difference between each symbol estimate and the corresponding hard symbol decision as given by:

$$e_k^p = (\tilde{z}_k^p - \hat{s}_k^{p,hard})(\tilde{z}_k^p - \hat{s}_k^{p,hard})^* \; k=0,1,\ldots,K-1; p=0, 1, \ldots, P-1 \quad (28)$$

The total distortion is then calculated to give the combining weight selection metric, e.g., as illustrated by Step 308 of FIG. 3, as given by:

$$D = \sum_{p=0}^{P-1}\sum_{k=0}^{K-1} e_k^p \quad (29)$$

If the metric D satisfies the threshold, the high SINR combining weights $w_{high-SINR}$ are used for demodulation, e.g., as illustrated by Steps 310 and 312 of FIG. 3. Further, the impairment covariance matrix estimate derived in accordance with equation (26) is used to estimate SINR as given by:

$$SINR_{est} = \frac{|w_{high-SINR}^H \hat{h}_{high-SINR}|^2}{w_{high-SINR}^H \hat{R}_u^{hard} w_{high-SINR}} \quad (30)$$

On the other hand, the low-SINR combining weights $w_{low-SINR}$ are selected for signal demodulation when the metric D does not satisfy the threshold, e.g., as illustrated by Steps 310 and 314 of FIG. 3. Also, the impairment covariance matrix $\hat{R}_{u,low-SINR}$ determined in accordance with equation (17) is used as an approximation of the true impairment covariance. $\hat{R}_{u,low-SINR}$ is used to estimate SINR when the metric D fails to satisfy the threshold as given by:

$$SINR_{est} = \frac{|w_{low-SINR}^H \hat{h}_{low-SINR}|^2}{w_{low-SINR}^H \hat{R}_u^{hard} w_{low-SINR}} \quad (31)$$

Thus, signal quality estimation and demodulation are tailored to the signal quality level of the received signal.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing a received signal, comprising:
   determining a first set of combining weights based on a first impairment covariance estimate derived assuming a low signal quality environment;
   determining a second set of combining weights based on a second impairment covariance estimate derived assuming a high signal quality environment;
   determining a metric corresponding to the difference between symbol estimates derived from the second set of combining weights and hard symbol decisions; and
   demodulating the received signal based on the second set of combining weights if the metric satisfies a threshold indicating high signal quality and otherwise based on the first set of combining weights.

2. The method of claim 1, wherein determining the metric comprises:
   calculating the error between the symbol estimates and the hard symbol decisions; and
   accumulating the error over a WCDMA slot of interest.

3. The method of claim 2, wherein calculating the error between the symbol estimates and the hard symbol decisions comprises:
  normalizing the symbol estimates;
  identifying a constellation point for each symbol estimate that minimizes the Euclidean distance between the symbol estimate and the constellation point; and
  calculating the error between each identified constellation point and the corresponding normalized symbol estimate.

4. The method of claim 1, wherein the threshold is based on the modulation scheme associated with the received signal.

5. The method of claim 1, wherein determining the first and second set of combining weights comprises:
  determining the first set of combining weights based on the first impairment covariance estimate and channel estimates derived assuming a low signal quality environment; and
  determining the second set of combining weights based on the second impairment covariance estimate and quality channel estimates derived assuming a high signal quality environment.

6. The method of claim 5, wherein determining the second set of combining weights comprises determining the second set of combining weights based on the second impairment covariance estimate and minimum mean square error (MMSE) channel estimates.

7. The method of claim 6, wherein the second impairment covariance estimate is derived by:
  scaling an interference covariance matrix derived from finger delays, channel delays and the MMSE channel estimates by an interference power scaling factor; and
  scaling a noise covariance matrix by a noise power scaling factor having a negligible magnitude corresponding to a high signal quality environment.

8. The method of claim 1, further comprising calculating a signal quality estimate for the received signal based on the second set of combining weights when the metric satisfies the threshold and the first set of combining weights otherwise.

9. The method of claim 8, wherein calculating the signal quality estimate comprises calculating a signal to interference plus noise ratio.

10. The method of claim 8, wherein calculating the signal quality comprises:
  determining a revised impairment covariance estimate based on scaled despread data values derived from the received signal and the hard symbol decisions; and
  calculating the signal quality estimate based on the revised impairment covariance estimate and the second set of combining weights.

11. The method of claim 10, wherein determining the revised impairment covariance estimate comprises:
  demodulating and scaling despread data values associated with the received signal to obtain the scaled despread data values;
  calculating a data covariance estimate based on the scaled despread data values; and
  calculating the revised impairment covariance estimate based on the data covariance estimate and a symbol scaling factor used to scale the despread data values.

12. The method of claim 11, wherein the symbol scaling factor is determined by calculating the inverse magnitude-squared of the hard symbol decisions.

13. A wireless receiver comprising a baseband processor configured to:
  determine a first set of combining weights based on a first impairment covariance estimate derived assuming a low signal quality environment;
  determine a second set of combining weights based on a second impairment covariance estimate derived assuming a high signal quality environment;
  determine a metric corresponding to the difference between symbol estimates derived from the second set of combining weights and hard symbol decisions; and
  demodulate a received signal based on the second set of combining weights if the metric satisfies a threshold indicating high signal quality and otherwise based on the first set of combining weights.

14. The wireless receiver of claim 13, wherein the baseband processor is configured to calculate the error between the symbol estimates and the hard symbol decisions and accumulate the error over a WCDMA slot of interest.

15. The wireless receiver of claim 14, wherein the baseband processor is configured to normalize the symbol estimates, identify a constellation point for each symbol estimate that minimizes the Euclidean distance between the symbol estimate and the constellation point, and calculate the error between each identified constellation point and the corresponding normalized symbol estimate.

16. The wireless receiver of claim 13, wherein the threshold is based on the modulation scheme associated with the received signal.

17. The wireless receiver of claim 13, wherein the baseband processor is configured to determine the first set of combining weights based on the first impairment covariance estimate and channel estimates derived assuming a low signal quality environment and determine the second set of combining weights based on the second impairment covariance estimate and quality channel estimates derived assuming a high signal quality environment.

18. The wireless receiver of claim 17, wherein the baseband processor is configured to determine the second set of combining weights based on the second impairment covariance estimate and minimum mean square error (MMSE) channel estimates.

19. The wireless receiver of claim 18, wherein the baseband processor is configured to derive the second impairment covariance estimate by:
  scaling an interference covariance matrix derived from finger delays, channel delays and the MMSE channel estimates by an interference power scaling factor; and
  scaling a noise covariance matrix by a noise power scaling factor having a negligible magnitude corresponding to a high signal quality environment.

20. The wireless receiver of claim 13, the baseband processor is further configured to calculate a signal quality estimate for the received signal based on the second set of combining weights when the metric satisfies the threshold and the first set of combining weights otherwise.

21. The wireless receiver of claim 20, wherein the baseband processor is configured to calculate a signal to interference plus noise ratio.

22. The wireless receiver of claim 20, wherein the baseband processor is configured to determine a revised impairment covariance estimate based on scaled despread data values derived from the received signal and the hard symbol decisions and calculate the signal quality estimate based on the revised impairment covariance estimate and the second set of combining weights.

23. The wireless receiver of claim 22, wherein the baseband processor is configured to demodulate and scale despread data values associated with the received signal to obtain the scaled despread data values, calculate a data covariance estimate based on the scaled despread data values, and calculate the revised impairment covariance estimate based on the data covariance estimate and a symbol scaling factor used to scale the despread data values.

24. The wireless receiver of claim 23, wherein the baseband processor is configured to determine the symbol scaling factor by calculating the inverse magnitude-squared of the hard symbol decisions.

25. A mobile terminal including the wireless receiver as claimed in claim 13.

26. A base station including the wireless receiver as claimed in claim 13.

* * * * *

UNITED STATES PATENT AND TRADEMARK OFFICE
CERTIFICATE OF CORRECTION

PATENT NO. : 8,000,413 B2
APPLICATION NO. : 11/841264
DATED : August 16, 2011
INVENTOR(S) : Cairns Page 1 of 1

It is certified that error appears in the above-identified patent and that said Letters Patent is hereby corrected as shown below:

In Column 6, Line 53, in Equation (13), delete " $\hat{g}_{high\text{-}SNR}=(B^H B)^{-1} B^H \hat{h}_{high\text{-}SINR}$ " and insert -- $\hat{\mathbf{g}}_{high\text{-}SINR} = (\mathbf{B}^H \mathbf{B})^{-1} \mathbf{B}^H \hat{\mathbf{h}}_{high\text{-}SINR}$ --, therefor.

In Column 7, Lines 60-61, in Equation (19), delete " $\sum_{l=0}^{L-1}\sum_{q=0}^{L-1} \hat{g}_{low\text{-}SINR}(l)\hat{g}^*_{low\text{-}SINR}(q)$ " and insert -- $\sum_{l=0}^{L-1}\sum_{q=0}^{L-1} \hat{g}_{high\text{-}SINR}(l)\hat{g}^*_{high\text{-}SINR}(q)$ --, therefor.

In Column 9, Line 38, delete " $\hat{s}_k^{hard}$ " and insert -- $\hat{s}_k^{p,hard}$ --, therefor.

Signed and Sealed this
Twentieth Day of March, 2012

David J. Kappos
*Director of the United States Patent and Trademark Office*